United States Patent

Bertsche

Patent Number: 5,194,009
Date of Patent: Mar. 16, 1993

[54] PROJECTION APPARATUS FOR PLANETARIUMS

[75] Inventor: Herbert Bertsche, Heidenheim, Fed. Rep. of Germany

[73] Assignee: Carl Zeiss-Stiftung, Heidenheim, Fed. Rep. of Germany

[21] Appl. No.: 824,550

[22] Filed: Jan. 23, 1992

[30] Foreign Application Priority Data

Feb. 8, 1991 [DE] Fed. Rep. of Germany ....... 4103845

[51] Int. Cl.⁵ ............................................. G09B 27/00
[52] U.S. Cl. .................................................... 434/286
[58] Field of Search ...................... 434/286, 285, 284; 353/62

[56] References Cited

U.S. PATENT DOCUMENTS

| | | | |
|---|---|---|---|
| 2,168,799 | 8/1939 | Korkosz et al. | 434/286 |
| 2,748,652 | 6/1956 | Bauersfeld et al. | 434/286 |
| 3,074,183 | 1/1963 | Frank | 434/286 |
| 3,552,037 | 1/1971 | Stern | 434/286 |
| 3,589,035 | 6/1971 | Vickery | 434/286 |
| 3,596,379 | 8/1971 | Faulkner | 434/286 |
| 3,707,786 | 1/1973 | Clark | 434/286 |
| 4,643,681 | 2/1987 | Suzuki et al. | 434/286 |

Primary Examiner—John J. Wilson
Assistant Examiner—Jeffrey A. Smith

[57] ABSTRACT

Projection devices (2, . . . , 9) for representing the orbital curves of planets are fitted in several planes beneath the main instrument (1) for fixed star projection. The projection devices (2, . . . , 9) can be moved, respectively independently of each other, around a common vertical axis (14). They include, in addition to the projection units proper, deflecting mirrors which are rotatable relative to the projection units. The spacings of the deflecting mirrors from the common vertical axis of rotation (14) increase in the direction from above to below the apparatus.

12 Claims, 3 Drawing Sheets

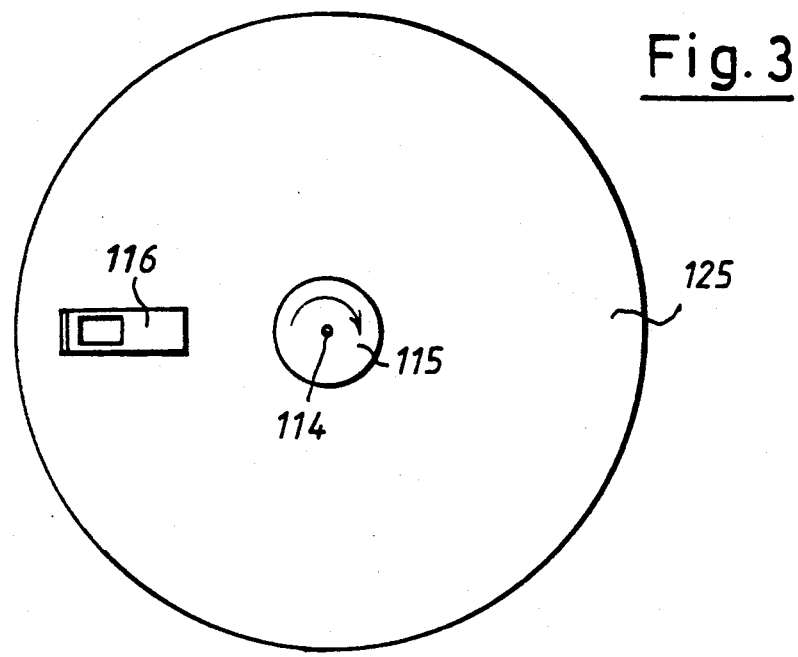
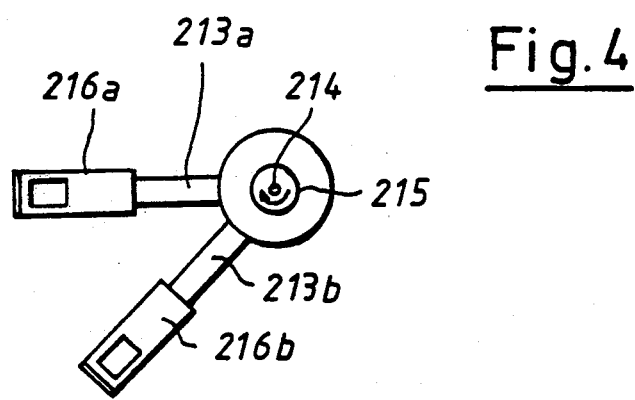

PROJECTION APPARATUS FOR PLANETARIUMS

TECHNICAL FIELD

The invention relates to a projection apparatus in planetariums.

In the usual planetariums (according to Bauersfeld), the main instrument for projection of the fixed stars is located in the center of the projection dome. Further projection units arranged separately from it are used, e.g., illustrating the orbital curves of planets.

The fixed arrangement, for example, of the planet projection units near the main instrument is known. With a unidirectional seating arrangement of the spectators in front of the main instrument, this has the consequence that the fixed star projector screens off a partial region of the dome and does not permit any projection of the planetary orbital curves at such partial regions. A further consequence of such an arrangement of the planet projection units is that the projection distances of the individual planet projectors to the dome are different at different points on the dome, and as a result always have to be readjusted in the course of the path movement in order to obtain a sharp object projection.

BACKGROUND ART

An arrangement was proposed in U.S. Pat. Nos. 3,596,379 and 3,707,786 of planet projection units in a carrier frame in several planes one above the other under the main instrument. This carrier frame can be moved together with the projectors both around the longitudinal axis of the system and also about a horizontal axis. To prevent the individual planet projectors screening each other off, the carrier frame is arranged at a given angle to the longitudinal axis of the system. Such an arrangement of the planetary projection units does in fact avoid the problem of screening by the main instrument; however, enormous mechanical problems arise. Balancing weights are necessary for the tilted carrier frame for the required longitudinal axis rotational motion, and likewise for rotation of the carrier frame together with the projection units about the horizontal axis. These balancing weights are required in order to compensate for the respective asymmetric weight distribution about the axis of rotation. Problems arise with the precision drives which are necessary for such systems. Restrictions thus arise both on space and on weight in the choice of the planet projection units. A further disadvantage is that the required signal and supply leads to the projection units have to be passed through at least two expensive slip ring systems. In addition to this, the control of the two rotational motions is very expensive.

DISCLOSURE OF INVENTION

The object of the present invention is therefore to provide an apparatus for projection in planetariums offering a mechanically uncomplicated solution and also permitting projection over the entire projection dome of all the objects to be represented.

This object is achieved by an apparatus for projection in planetariums, which includes in addition to a main instrument for fixed star projection, a plurality of projection devices arranged in different planes beneath said main apparatus, wherein several of the projection devices are mounted for rotation independently of each other around a common vertical axis in a respective plane of rotation; each of the projection devices includes a projection unit and at least one deflecting mirror that is rotatable relative to the projection unit, and the deflecting mirrors are spaced increasingly from the common vertical axis in the direction from above to below the apparatus.

Advantageous forms of embodiment include the following additional features:

Each of the projection devices including its deflecting mirror is arranged on a carrier arm that is mounted for rotation around the common vertical axis.

The projection unit has an optical axis and the deflecting mirror is arranged at an outer end of the carrier arm in an extension of the optical axis of the projection unit and is mounted for rotation about the optical axis.

A disk is provided in each plane of rotation which is rotatable around the vertical axis and on which at least one projection unit is arranged.

The portion of the projection device that includes the projection unit and the deflecting mirror is in a protective housing.

The protective housing has a partial aperture arranged in the direction of a projection dome of the planetarium to effect a screening off of a projection beam from the projection device at the horizon of the projection dome by the protective housing.

A drive for rotational motion of the deflecting mirror is located in the protective housing.

Several carrier arms for projection devices are provided in each plane of rotation. Computer means is arranged to control rotation of the deflecting mirror and rotation of the projection devices around the common vertical axis.

The apparatus is arranged to represent the sky with fixed stars and also the orbital curves of planets.

The space and weight restrictions for the individual projection units which resulted from their placement in the carrier frame no longer apply when the planet projection units are arranged in several separate planes of rotation beneath the main instrument for fixed star representation. Thus for example several projection units can be arranged on one plane of rotation, thus achieving multifarious possibilities of use.

The corresponding design of the protective housing in which the projection unit together with a deflecting mirror and the associated drive are fitted makes it possible for the projection beam to be automatically screened off by the housing at the horizon, without having to use expensive screening mechanisms.

Furthermore, because of the rotation of the projection units about only a single vertical axis, only one slip ring system is needed to connect the signal and supply leads to the individual projection units.

In all, a simplified mechanical construction is achieved, facilitating both better possibilities of mounting and maintenance and also the software control of the whole system.

The screening off of portions of the projection dome by the main instrument, or the mutual screening off of the projection units, is avoided by corresponding dimensioning of the spacings of the deflecting mirrors from the vertical rotation axis, or respectively by the increasing spacings from above to below.

BRIEF DESCRIPTION OF DRAWINGS

Further advantages of the invention will be evident from the following description of preferred embodiments in which

FIG. 3 shows a second embodiment of the invention employing a rotatable disk;

FIG. 4 shows a further embodiment of the invention in which a plurality of projection units are arranged in the same plane of rotation.

PREFERRED EMBODIMENTS FOR CARRYING OUT THE INVENTION

Figure 1:
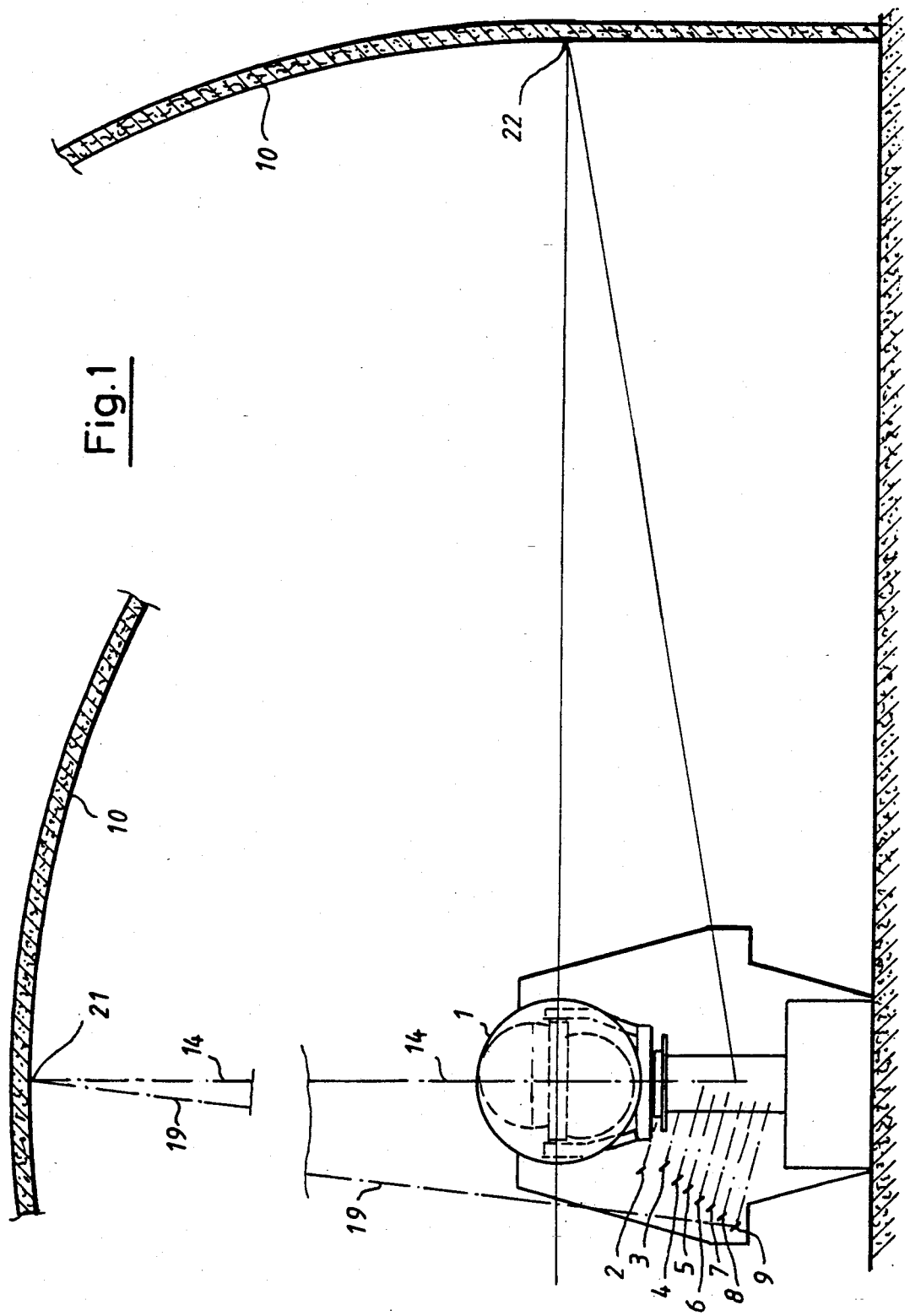
FIG. 1 shows a partial section through the projection dome, with a schematic illustration of the arrangement of the main instrument and planet projection devices.

The arrangement of the fixed star main instrument (1) and the planet projection devices (2, ..., 9) within the projection dome (10) is shown in FIG. 1. The planet projection devices (2, ..., 9) are arranged horizontally one above the other beneath the main instrument (1) for fixed star projection which is located in the center of the dome. These devices (2, ..., 9) are in this embodiment in the form of carrier arms to which the projection units and also the deflecting mirrors are attached. The carrier arms are thus mounted for motion about the vertical axis (14) of the system and can be separately driven by motors and correspondingly controlled by a connected computer. The detailed carrier arm structure is described in more detail in FIG. 2. The length of the carrier arms including projection units increases from above to below, in order to avoid mutual screening of the individual carrier arms and projection units (2, ..., 9). The corresponding dimensioning of the carrier arms, and also the rotational motion about the vertical axis (14), thus ensure that a screening off of the planetary orbital curves by the main instrument (1) no longer occurs and that each point of the projection dome (10) can be reached.

Figure 2:
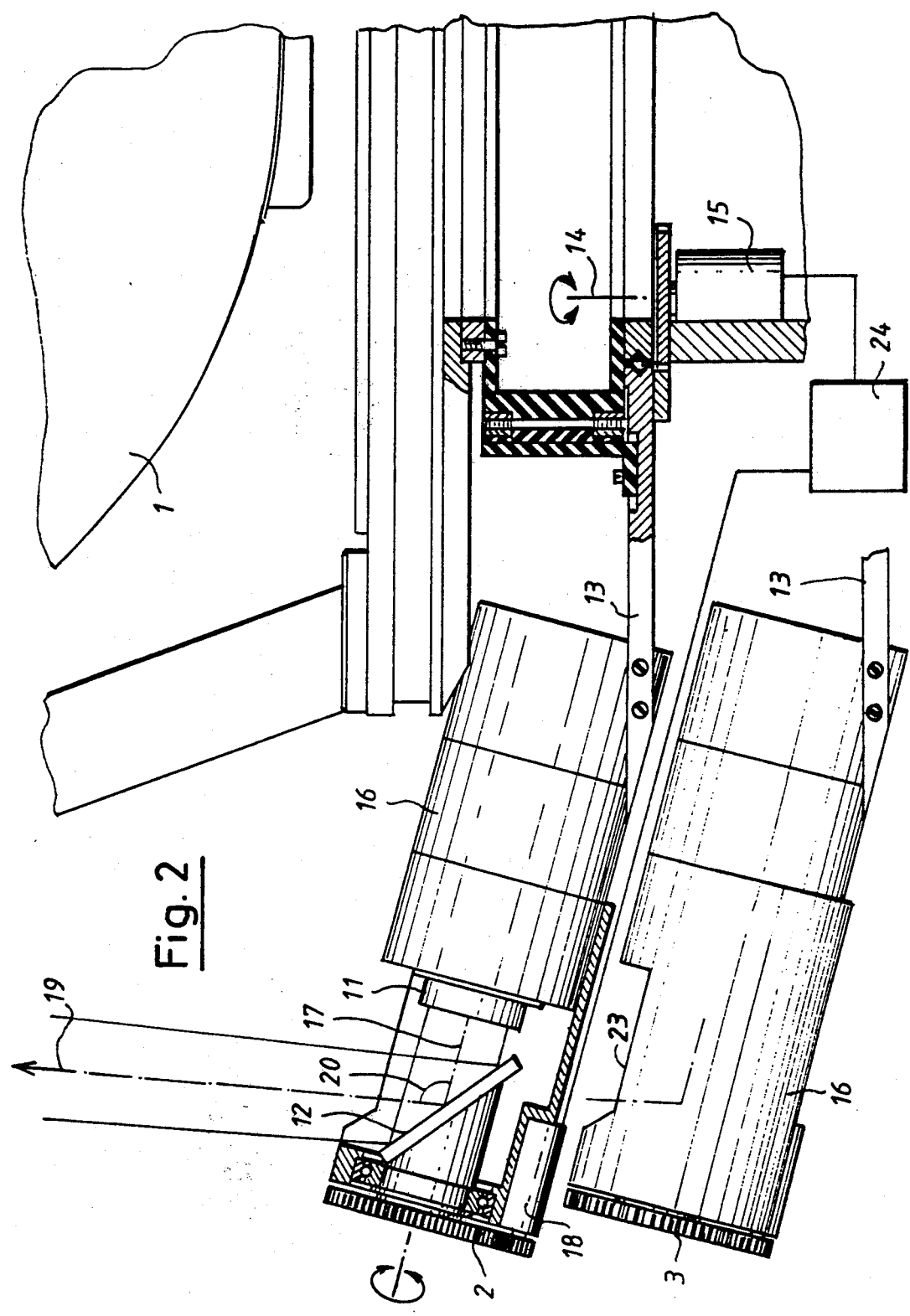
FIG. 2 shows a partial section of a carrier arm arrangement.

The structure of the uppermost carrier arm (2), together with the projection unit (11) and deflecting mirror (12) is shown in FIG. 2. Apart from the different lengths of the carrier arms, the other projection devices (3, ..., 9) have in principle the same structure. The carrier arm rod proper (13) is mounted to move around the vertical axis (14) and can be moved around this axis by means of a motor (15). A cylindrical protective housing (16) is mounted at the outer end of the carrier arm rod (13) at a given angle to the carrier arm rod (13), and contains the projection unit proper (11) and also the deflecting mirror (12) which moves around the optical axis (17) of the projection unit (11). In its inoperative position, the deflecting mirror (12) is arranged at a given angle (20) to the zenith (21) of the projection dome. It can be moved by means of a motor (18) around the optical axis (17) of the projection unit, this motor (18) likewise being controlled by the connected computer. Hence the deflected projection beam (19) sweeps, for example, through an orbital curve from the zenith (21) to the horizon (22).

The protective housing (16) is geometrically designed so that screening off of the projection beam (19) at the horizon (22) takes place automatically, due to corresponding dimensioning of the beam exit aperture (23).

The drives for the motion around the vertical axis (14) and also for the rotation of the deflecting mirror (12) are controlled by a computer (24) to represent the orbital curve of a planet, according to the function which specifies the motion of the object to be represented.

FIG. 3 shows an alternative to the carrier arm arrangement for moving the projection units of each plane of rotation around the vertical axis. The projection unit (116) and the deflecting mirror are mounted on a rotatable disk (125). The disk (125) can be moved around the vertical axis (114) by a motor (115). Corresponding dimensioning of the disk radii, analogously to the carrier arm radii, prevents screening off.

A further embodiment of the invention is shown in FIG. 4. It consists of accommodating several projection units in one plane of rotation and thus widening the projection possibilities of this arrangement. Two carrier arms (213a, 213b) and projection units (216a, 216b) are arranged in the same plane of rotation. The carrier arms (213a, 213b) and the projection units (216a, 216b) are moved around the vertical axis (214) by a motor (215).

I claim:

1. Apparatus for projection in planetariums, which includes in combination with a main instrument for fixed star projection, a plurality of projection devices arranged in different planes beneath said main instrument, wherein several of said projection devices are mounted for rotation independently of each other around a common vertical axis in a respective plane of rotation, each of said projection devices is connected to and positionable independently by a respective drive, wherein each of said drives is arranged in relation to said common vertical axis providing a symmetric weight distribution about said common vertical axis, each of said projection devices includes a projection unit and at least one deflecting mirror that is rotatable relative to said projection unit, and said deflecting mirrors are spaced increasingly from said common vertical axis in the direction from above to below said apparatus.

2. Apparatus for projection in planetariums, which includes in combination with a main instrument for fixed star projection, a plurality of projection devices arranged in different planes beneath said main instrument, wherein several of said projection devices are mounted for rotation independently of each other around a common vertical axis in a respective plane of rotation, each of said projection devices is connected to and positionable independently by a respective drive, wherein each of said drives is arranged in relation to said common vertical axis so as to provide a symmetric weight distribution about said common vertical axis, each of said projection devices includes a projection unit and at least one deflecting mirror that is rotatable relative to said projection unit, said projection device including said deflecting mirror is arranged on a carrier arm that is mounted for rotation around said common vertical axis, and said deflecting mirrors are spaced increasingly from said common vertical axis in the direction from above to below said apparatus.

3. Apparatus for projection in planetariums, which includes in combination with a main instrument for fixed star projection, a plurality of projection devices arranged in different planes beneath said main instrument,
- wherein several of said projection devices are mounted for rotation independently of each other around a common vertical axis in a respective plane of rotation,
- each of said projection devices is connected to and positionable independently by a respective drive, wherein each of said drives is arranged in relation to said common vertical axis so as to provide a symmetric weight distribution about said common vertical axis,
- each of said projection devices includes a projection unit and at least one deflecting mirror that is rotatable relative to said projection unit,
- a disk is provided in each plane of rotation, which disk is rotatable around said common vertical axis and on which at least one projection unit is arranged, and
- said deflecting mirrors are spaced increasingly from said common vertical axis in the direction from above to below said apparatus.

4. Apparatus for projection in planetariums according to one of claims 1 or 2, wherein said projection unit has an optical axis and said deflecting mirror is arranged at an outer end of said carrier arm in an extension of said optical axis of said projection unit and is mounted for rotation about said optical axis.

5. Apparatus for projection in planetariums according to one of claims 1, 2 or 3, wherein said projection unit and said deflecting mirror are in a protective housing.

6. Apparatus for projection in planetariums according to claim 5, wherein said protective housing has a partial aperture arranged in the direction of a projection dome of the planetarium to effect a screening off of a projection beam from said projection device at the horizon of said projection dome by said protective housing.

7. Apparatus for projection in planetariums according to claim 5, wherein a drive for rotational motion of said deflecting mirror is located in said protective housing.

8. Apparatus for projection in planetariums according to claim 7, comprising computer means arranged to control independent rotation of said deflecting mirror and independent rotation of each plane of rotation around said common vertical axis.

9. Apparatus for projection in planetariums according to claim 5, comprising computer means arranged to control independent rotation of said deflecting mirror and independent rotation of each plane of rotation around said common vertical axis.

10. Apparatus for projection in planetariums according to one of claims 1, or 2, wherein several carrier arms for projection devices are provided in each plane of rotation.

11. Apparatus for projection in planetariums according to one of claims 1, 2 or 3, comprising computer means arranged to control independent rotation of said deflecting mirror and independent rotation of each plane of rotation around said common vertical axis.

12. Apparatus for projection in planetariums according to one of claims 1, 2, or 3 where in said apparatus is arranged to represent the sky with fixed stars and the ordital curbes of planets.

* * * * *